US007195567B2

(12) United States Patent
Lu

(10) Patent No.: US 7,195,567 B2
(45) Date of Patent: Mar. 27, 2007

(54) DECORATIVE GRIP AND METHOD FOR MANUFACTURE

(76) Inventor: Clive S. Lu, 282 NewBridge Rd., Hicksville, NY (US) 11801

( * ) Notice: Subject to any disclaimer, the term of this patent is extended or adjusted under 35 U.S.C. 154(b) by 0 days.

(21) Appl. No.: 11/178,502

(22) Filed: Jul. 12, 2005

(65) Prior Publication Data

US 2005/0250593 A1 Nov. 10, 2005

Related U.S. Application Data

(63) Continuation-in-part of application No. 10/857,891, filed on Jun. 2, 2004, now abandoned, which is a continuation-in-part of application No. 10/760,412, filed on Jan. 21, 2004.

(51) Int. Cl.

| | |
|---|---|
| ***A63B 53/14*** | (2006.01) |
| ***A63B 59/06*** | (2006.01) |
| ***A63B 49/00*** | (2006.01) |
| ***B25G 1/01*** | (2006.01) |
| ***A45C 3/00*** | (2006.01) |
| ***B62K 21/26*** | (2006.01) |

(52) U.S. Cl. ...................... 473/300; 473/568; 473/549; 74/551.9; 81/489; 280/821; 16/421

(58) Field of Classification Search ........ 473/300–303, 473/568, 551, 523, 549; D21/756; D8/DIG. 6–8; 74/551.9; 81/489–490, 492; 28/821; 16/421, 16/430, DIG. 18–19, DIG. 12, 24; 280/821
See application file for complete search history.

(56) References Cited

U.S. PATENT DOCUMENTS

| | | | | |
|---|---|---|---|---|
| 1,902,438 | A | 3/1933 | Foley | |
| 2,772,090 | A * | 1/1956 | Brandon | 473/301 |
| 3,567,237 | A | 3/1971 | Miller, III | |
| 3,606,326 | A * | 9/1971 | Sparks | 473/300 |
| 4,195,837 | A | 4/1980 | Poulin | |
| 4,473,376 | A * | 9/1984 | Hansen et al. | 8/639 |
| 4,589,421 | A * | 5/1986 | Ullman | 600/576 |
| 5,570,884 | A * | 11/1996 | Carps | 473/298 |
| 5,637,244 | A | 6/1997 | Erokhin | |
| 5,711,720 | A | 1/1998 | Janes et al. | |
| 6,122,802 | A | 9/2000 | Lo | |
| 6,287,221 | B1 | 9/2001 | Pino | |
| 6,314,598 | B1 | 11/2001 | Yates | |
| 6,854,163 | B1 | 2/2005 | Ruana | |
| 2003/0202362 | A1 | 10/2003 | Liou | |
| 2003/0211900 | A1* | 11/2003 | Novak et al. | 473/300 |
| 2005/0083676 | A1 | 4/2005 | VanderSchult | |
| 2005/0221909 | A1* | 10/2005 | Nam | 473/300 |

FOREIGN PATENT DOCUMENTS

| | | |
|---|---|---|
| JP | 2002/52480 | 2/2002 |

* cited by examiner

*Primary Examiner*—Stephen Blau
(74) *Attorney, Agent, or Firm*—Welsh & Flaxman LLC

(57) ABSTRACT

A grip includes a transparent polymeric body having an inner surface and an outer surface and a design formed along the inner surface. The grip is formed by forming a transparent polymeric body shaped and dimensioned for attachment to an article and for gripping by an individual and creating a channel or group of channels in a manner forming a design along the inner surface of the polymeric body.

17 Claims, 4 Drawing Sheets

DECORATIVE GRIP AND METHOD FOR MANUFACTURE

CROSS REFERENCE TO RELATED APPLICATIONS

This is a continuation-in-part of U.S. patent application Ser. No. 10/857,891, filed Jun. 2, 2004, now abandoned entitled "DECORATIVE GRIP AND METHOD FOR MANUFACTURE", which is currently pending, and which is a continuation-in-part of U.S. patent application Ser. No. 10/760,412, filed Jan. 21, 2004, entitled "DECORATIVE GRIP AND METHOD FOR MANUFACTURE", which is currently pending.

BACKGROUND OF THE INVENTION

1. Field of the Invention

The invention relates to decorative grips and a method for manufacturing the decorative grips. More particularly, the invention relates to transparent, decorative grips including a three-dimensional design within the grip, the design being shaped through creation of a channel in a transparent grip blank.

2. Description of the Prior Art

As molding techniques have improved over the years, manufacturers have begun to develop a variety of molded grips/handles for use with sporting implements, tools and appliances. These grips/handles take a variety of forms and manufacturers are consistently attempting to distinguish themselves within the marketplace by providing grips and/or handles different from those of their competitors. As such, various techniques and apparatuses for use in the manufacture of decorative and distinguishable grips/handles have been developed.

With this in mind, a need continues to exist for improved grips and/or handles, as well as a method for manufacturing the grips and/or handles. The present invention provides such a grip/handle as well as a method for manufacturing the grip/handle.

SUMMARY OF THE INVENTION

It is, therefore, an object of the present invention to provide a grip including a transparent polymeric body having an inner surface and an outer surface. The grip also includes a design formed along the inner surface of the body, the design comprising a channel formed in an aesthetically desirable pattern.

It is also an object of the present invention to provide a method for forming a decorative grip. The method is achieved by forming a transparent polymeric body shaped and dimensioned for attachment to an article and for gripping by an individual, the body including an inner surface and an outer surface, and creating a channel in a manner forming a design along the inner surface of the polymeric body. The channel is filled with a solvent visibly distinct from the transparent polymeric body.

It is another object of the present invention to provide a golf club with a transparent grip, the grip being shaped and dimensioned to fit over a shaft of a golf club. The golf club includes a shaft having a first end with a club head secured thereto and a second end with a grip secured thereto. The grip includes a transparent polymeric body having an inner surface and an outer surface, and a design formed along the inner surface of the body. The design comprises a channel formed in an aesthetically desirable pattern. The channel is filled with a solvent visibly distinct from the transparent polymeric body.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
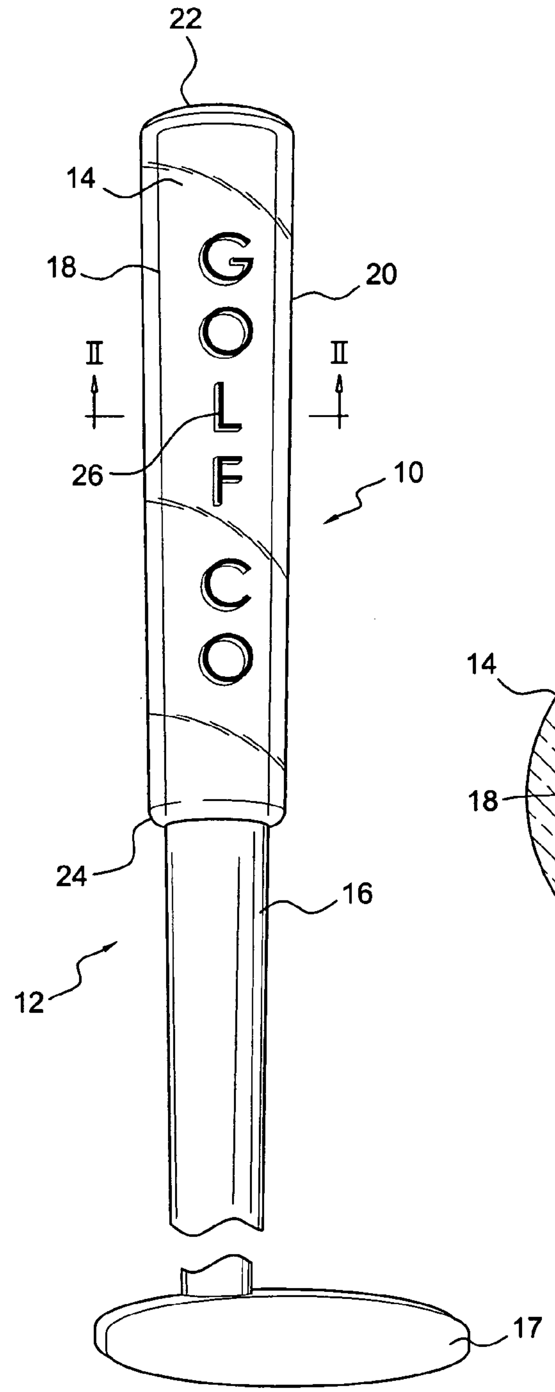
FIG. 1 is a perspective view of a golf grip in accordance with the present invention.
Figure 2:
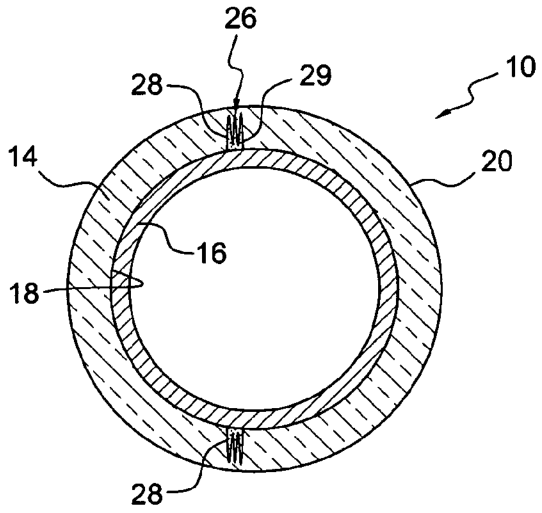
FIG. 2 is a cross sectional view along the line II—II in FIG. 1.

With reference to FIGS. 1 and 2, a decorative grip 10 in accordance with the present invention is disclosed. Although the term "grip" is used throughout the present specification, those skilled in the art will appreciate that the invention is not limited to grips per se, but may be employed with a variety of structures shaped and dimensioned for gripping by the user of the implement to which the structure is secured.

The grip 10 in accordance with a preferred embodiment of the present invention is designed for use in conjunction with a golf club 12 including a shaft 16 and club head 17. However, those skilled in the art will appreciate that the principles of the present invention may be applied in the manufacture of grips for various purposes without departing from the spirit of the present invention. For example, the concepts of the present invention may be applied in the manufacture of (but not limited to) tennis grips, racquetball grips, squash grips, hammer handles, appliance handles, tool handles, motorcycle grips, bicycle grips, badminton grips and all other sports equipment grips, etc.

The grip 10 includes a body 14 of transparent polymeric material. Those skilled in the art will appreciate that grips may be formed from a variety of polymeric materials depending upon the needs of the particular activity, and it is the intention of the present invention not to limit the scope of the invention to particular materials. The grip 10 is shaped and dimensioned for its particular purpose. As such, the grip 10 disclosed in accordance with a preferred embodiment of the present invention is shaped and dimensioned for attachment to the shaft 16 of a conventional golf club 12. The body 14 is substantially cylindrical and includes an inner surface 18 and an outer surface 20 with a first end 22 and a second end 24. The first end 22 is substantially closed and constitutes the butt end of the grip 10, while the second end 24 is substantially open permitting the grip 10 to be slid over the golf shaft 16 during assembly of the golf club 12.

The body 14 of the grip 10 includes a three-dimensional design 26 formed along the inner surface 18 and extending toward the outer surface 20 of the body 14. The design 26 may take any aesthetically desirable form and the invention is not limited to specific designs. In fact, the design 26 is only limited by the imagination of the individual and the method used to implement the design 26. In accordance with a preferred embodiment, the method includes creating a channel 28, or group of channels, in the form of the desired design 26 within polymeric body 14 followed by filling of the channel(s) with a solvent 29. The filled channel 28 is discernable from the transparent polymeric material due to the presence of the solvent 29. Particularly precise changes are achieved by programming the laser or other tool used in the creation of the design.

Figure 3:
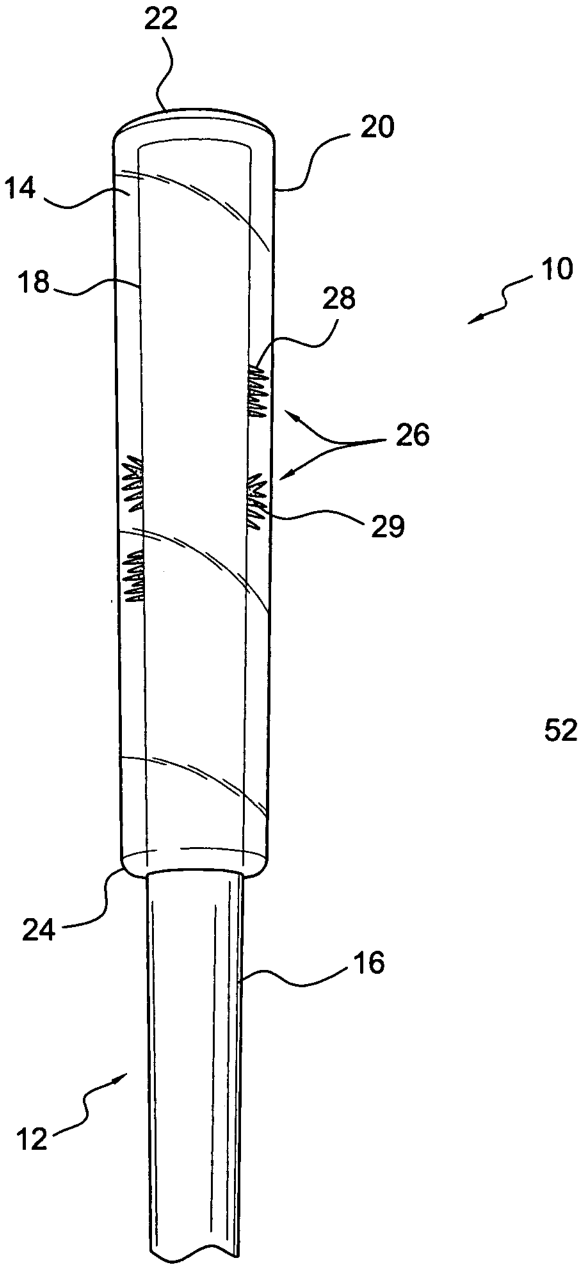
FIG. 3 is a cross sectional view of a grip in accordance with an alternate embodiment of the present invention.

As briefly mentioned above, the design 26 is formed along the inner surface 18 and extends toward the outer surface 20 of the body 14, creating the appearance that the design 26 is trapped between the two surfaces 18, 20. More specifically, and with reference to FIG. 3, in a preferred method a channel 28 or group of channels is formed in the grip 10 in the shape of the desired design 26. The channel 28 may be formed in any feasible manner. For example, a laser may be used to cut the channel 28 in the polymeric body 14 in the form of the design 26. Similarly, a needle, punch, or other tool may be used to form the channel 28. As yet another option, the channel 28 may be formed during the formation of the polymeric body 14, such as through injection molding of a mold including the channel 28. While these methods are exemplary and not meant to limit the scope of the invention, they each allow the channel 28 to be situated along the inner surface 18 and extend toward the outer surface 20 of the body 14.

The channel 28 is within the thickness of the grip 10 and does not break the outer surface 20 of the body 14. The channel 28, or a plurality of channels, is thereby implemented to form the shape of design 26. Once the channel 28 is formed, the solvent 29 is applied to fill the channel 28. Filling occurs due to a capillary effect that draws the solvent 29 into the channel 28. The solvent 29 is in the form of a liquid and, as such, is influenced by adhesive and cohesive forces as well as the influence of surface tension. When the solvent 29 is in close association with the channel 28, it is drawn into the channel 28 in a siphon-like motion due to adhesion between the solvent 29 and the polymeric body 14. Cohesion between the molecules comprising the solvent 29 pulls additional solvent into the channel 28 as it travels to the channel's end. Thus the solvent 29 is elevated or depressed within a channel 28 due to these attractive forces. This phenomenon is commonly referred to as capillarity or capillary action. In a preferred embodiment, each channel 28 is dimensioned to promote the phenomenon.

The solvent 29 may be composed of any material suitable for drawing into a channel 28 and taking advantage of capillarity. The solvent 29 may have adhesive qualities to secure it within each channel 28 and/or assist in adhering the grip 10 to the shaft 16. Similarly, the solvent 29 may be combined with an adhesive used to adhere the grip 10 to the shaft 16, thereby dissolving some of the adhesive to assist in positioning the grip 10 on the shaft 16. For example, a solvent 29 containing alcohol may be added to double-sided tape such that the adhesive in the tape partially dissolves. The strength of the tape is thereby diluted permitting its use in between the grip 10 on the shaft 16. As the alcohol in the solvent 29 evaporates, the adhesive regains its full strength securing the grip in place on the shaft 16. Any remaining solvent 29 is drawn into channel 28 due to capillarity and any pressure placed on the grip 10. Further, in order for the design 26 to be visible, the solvent 29 is visibly distinct from the body 14 of transparent polymeric material. The solvent 29 may include dye and/or colored pigments to further distinguish it from the transparent polymeric material. An observer is, therefore, able to see through the transparent material to the design 26 depicted by a solvent-filled channel 28 or group of channels.

As noted above, there are numerous methods available to create a channel 28 susceptible to capillarity and filling with the solvent 29. In accordance with a preferred embodiment of the present invention, a three-dimensional crystal laser inner engraving machine is utilized. The engraving machine generally includes a Nd: YAG laser, x-y-z scanning positioning unit, electronic control system and software. Such engraving machines are well known within the industry and a variety of machines may be utilized in accordance with the present invention without departing from the spirit of the invention. For example, China Tool, Inc. manufactures such a device sold under the name "Laser Engraving Tool". In addition, those skilled in the art will appreciate that the operating characteristics of the laser (for example, intensity duration, etc.) will be varied depending upon the polymer chosen for the blank and the desired design.

The engraving machine utilized in accordance with the present invention permits the creation of letters, logo types and real three-dimensional pictures, burned (or carved) through a fixed distance (depth) within the transparent body 14 for the creation of a complete grip 10 and the operation of the engraving machine is totally controlled through the use of a computer. As such, a user is able to define all marking specifications, including, but not limited to, the size and density of points and the position of images inside the blank transparent body.

Generally speaking, the laser energy creates a laser focus point which carves the polymer making a path of marks at a fixed depth within the transparent body 14 by creating high temperatures therein. By creating many of these focus points, a design 26 is produced within the transparent body 14. The focus points are created at different depths to create the three-dimensional effect. The desired patterns may be input to the system utilizing a variety of currently available design software, including, but not limited to, 3DMAX, AUTOCAD R14, PHOTOSHOP, etc.

Engravers of this type are highly dependable, provide long continuous working times and offer high engraving speeds. In addition, they operate with a variety of graphic functions and provide software that may be used to make a variety of patterns. In addition, the engravers offer non-contact processing, maintaining the transparent body 14 in a highly desirable condition.

Figure 4:
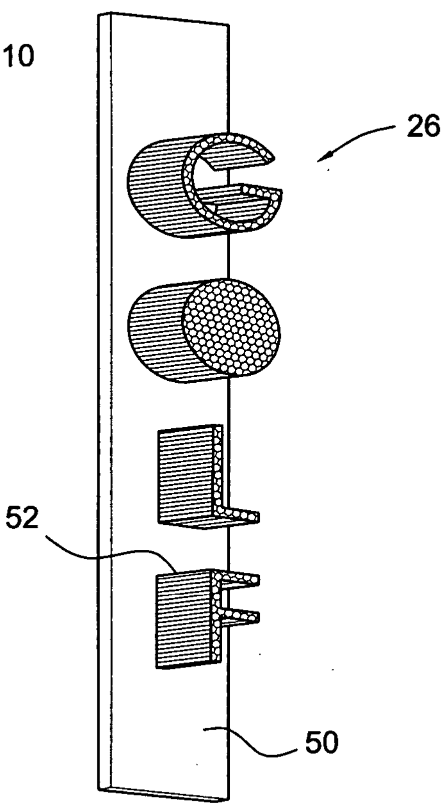
FIG. 4 is a perspective view of a design tool used in accordance with a preferred embodiment of the invention.

Still another preferred embodiment employs a method for creating a channel 28 in the form of the design 26 as exemplified in FIG. 4. Rather than cutting a channel 28 into the polymeric body 14, a design tool 50 is used to create a channel 28 as the polymeric body 14 is formed. The design tool includes a channel guide 52 for each channel needed to form design 26. The channel guide is dimensioned for a depth and size attributable to the desired depth and size of the channel 28. When placed in a mold for polymeric body 14, the polymer used to fill the mold surrounds and hardens around the channel guide 52. Once the polymer is set, design tool 50 is removed and the channel 28 is thereby formed in the location deserted by the channel guide 52. This method is particularly useful with conventional injection molding techniques.

Figure 5:
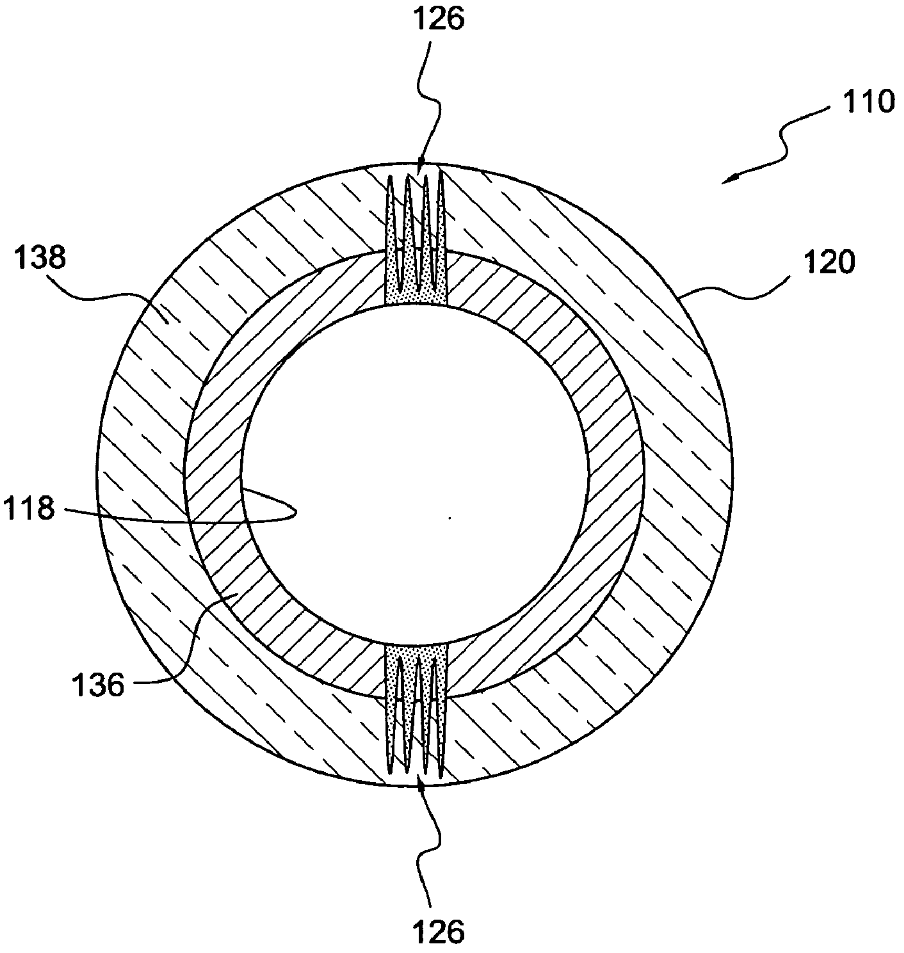
FIG. 5 is a cross sectional view of a grip in accordance with an alternate embodiment of the present invention.

In accordance with yet a further embodiment of the present invention, and with reference to FIG. 5, it is contemplated that the entire grip 110 need not be formed from a transparent material. Rather the grip may be formed with an inner layer 136 of an opaque material and an outer layer (or transparent body) 138 formed from a transparent material. As with the prior embodiment, the grip 110 includes inner and outer surfaces 118, 120, with the design 126 extending from the inner surface 110 toward the outer surface 120 is formed. The thickness of the relative inner and outer layers 136, 138 may be varied to suit the specifically aesthetic demands of the design one wishes to form within the grip.

Figure 6:
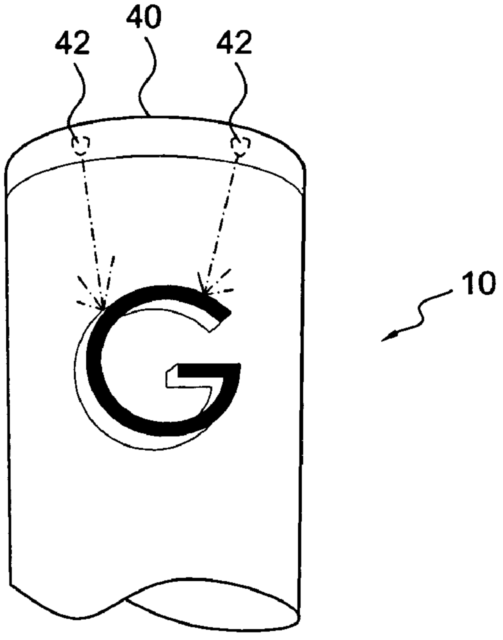
FIG. 6 is a perspective view of the present grip with an LED cap member secured thereto.
Figure 7:
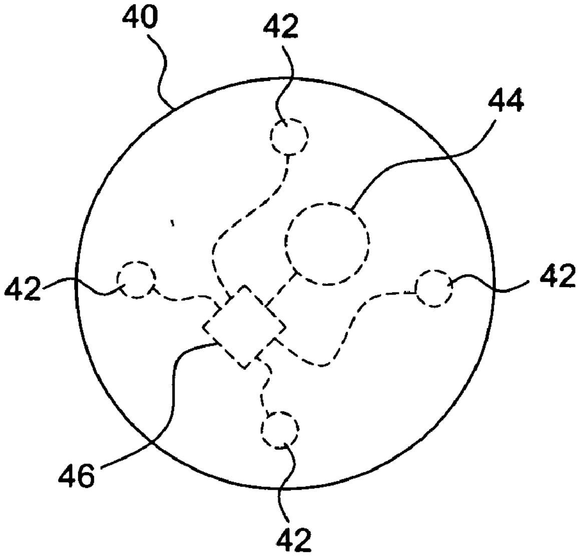
FIG. 7 is a top view of the cap member shown in FIG. 5.

With reference to FIGS. 6 and 7, the grip 10 may further be provided with a cap member 40 including LEDs 42 to enhance the appearance of the design 26 formed within the grip 10 and assist in locating the grip 10 in the dark. In particular, the cap member 40 is adapted for selective attachment to the first end 18 of the body 14 via a screw mechanism or other attachment technique (not shown). The cap member 40 is secured such that the plurality of LEDs 42 are mounted for directing light downwardly within the transparent body 14.

The cap member 40 is a self-contained device including the LEDs 42 and a power source 44 for powering the LEDs 42. As those skilled in the art will certainly appreciate, activation of the LEDs 42 may be achieved using a variety of switches 46 without departing from the spirit of the present invention.

In practice, the LEDs 42 direct light downwardly within the transparent body 14. The light will pass freely through the transparent material but hit the design 26 scattering light for viewing externally of the grip 10.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A grip, comprising:

a transparent polymeric body, the body being substantially cylindrical and having an inner surface and an outer surface;

a design formed along the inner surface of the body, the design comprising a channel formed in an aesthetically desirable pattern, the channel extending from the inner surface toward the outer surface of the body; and a solvent filling the channel, the solvent being visibly distinct from the transparent polymeric body and remaining within the channel to provide an aesthetically pleasing design.

2. The grip according to claim 1, wherein the channel is shaped and dimensioned to promote capillarity.

3. The grip according to claim 1, wherein the grip is shaped and dimensioned for attachment to a shaft of a golf club.

4. The grip according to claim 1, wherein the grip includes a first end and a second end, the first end being closed and the second end being open for attachment to an article.

5. The grip according to claim 1, wherein the grip includes a cap member including an LED.

6. A method for forming a decorative grip, comprising the following steps:

forming a transparent polymeric body shaped and dimensioned for attachment to an article and for gripping by an individual, the body being substantially cylindrical and including an inner surface and an outer surface;

forming a channel in the shape of a design along the inner surface of the polymeric body, the channel extending from the inner surface toward the outer surface of the body; and filling the channel with a solvent, the solvent being visibly distinct from the transparent polymeric body and remaining within the channel to provide an aesthetically pleasing design.

7. The method according to claim 6, wherein the channel is formed using a laser, a needle, design tool, or a punch.

8. The method according to claim 6, wherein the channel is formed during the formation of the polymeric body.

9. The method according to claim 6, wherein the channel is shaped and dimensioned to promote capillarity.

10. The method according to claim 6, farther including the step of securing the grip to an article.

11. The method according to claim 6, wherein the article is a shaft of a golf club.

12. A golf club with a transparent grip, the grip being shaped and dimensioned to fit over a shaft of a golf club, the golf club comprising:

a shaft having a first end with a club head secured thereto and a second end with a grip secured thereto, wherein the grip includes:

a transparent polymeric body, the body being substantially cylindrical and having an inner surface and an outer surface;

a design formed along the inner surface of the body, the design comprising a channel formed in an aesthetically desirable pattern, the channel extending from the inner surface toward the outer surface of the body; and a solvent filling the channel, the solvent being visibly distinct from the transparent polymeric body and remaining within the channel to provide an aesthetically pleasing design.

13. The golf club according to claim 12, wherein the channel is shaped and dimensioned to promote capillarity.

14. The gold club according to claim 12, wherein the transparent polymeric body is not entirely transparent.

15. The golf club according to claim 12, wherein the grip includes a cap member including an LED.

16. The golf club according to claim 12, wherein the solvent includes alcohol.

17. The golf club according to claim 12, wherein the solvent includes dye or colored pigments.

* * * * *